US009473762B2

(12) United States Patent
Zierke et al.

(10) Patent No.: US 9,473,762 B2
(45) Date of Patent: Oct. 18, 2016

(54) 3D CAMERA IN ACCORDANCE WITH THE STEREOSCOPIC PRINCIPLE AND METHOD OF DETECTING DEPTH MAPS

(71) Applicant: SICK AG, Waldkirch (DE)

(72) Inventors: Volker Zierke, Waldkirch (DE); Matthias Heinz, Waldkirch (DE)

(73) Assignee: SICK AG, Waldkirch (DE)

( * ) Notice: Subject to any disclaimer, the term of this patent is extended or adjusted under 35 U.S.C. 154(b) by 271 days.

(21) Appl. No.: 14/492,447

(22) Filed: Sep. 22, 2014

(65) Prior Publication Data

US 2015/0085082 A1 Mar. 26, 2015

(30) Foreign Application Priority Data

Sep. 26, 2013 (DE) .................. 10 2013 110 615

(51) Int. Cl.
*H04N 13/02* (2006.01)
*G06T 7/00* (2006.01)
*H04N 13/00* (2006.01)

(52) U.S. Cl.
CPC ......... *H04N 13/0271* (2013.01); *G06T 7/0075* (2013.01); *H04N 13/004* (2013.01); *H04N 13/0239* (2013.01); *H04N 13/0242* (2013.01); *H04N 13/0282* (2013.01); *G06T 2200/04* (2013.01); *G06T 2200/28* (2013.01);
(Continued)

(58) Field of Classification Search
CPC combination set(s) only.
See application file for complete search history.

(56) References Cited

U.S. PATENT DOCUMENTS

| 8,977,037 B1* | 3/2015 | Fang | G02B 27/2264 |
| | | | 348/E13.003 |
| 2002/0015048 A1* | 2/2002 | Nister | G06T 7/0065 |
| | | | 345/625 |

(Continued)

FOREIGN PATENT DOCUMENTS

| EP | 2275989 B1 | 1/2011 |
| WO | 0027131 A2 | 5/2000 |
| WO | 2013002280 A1 | 1/2013 |

OTHER PUBLICATIONS

Yang, Ruigang, et al. "Multi-Resolution Real-Time Stereo on Commodity Graphics Hardware"; 2013 IEEE Computer Society Conference on Computer Vision and Pattern Recognition; Madison, WI; Jun. 18-20, 2013.

(Continued)

*Primary Examiner* — Tracy Y Li
(74) *Attorney, Agent, or Firm* — Nath, Goldberg & Meyer; Jerald L. Meyer

(57) ABSTRACT

A 3D camera (10) in accordance with the stereoscopic principle for detecting depth maps (52) of a monitored zone 12) is set forth which has at least two camera modules (14*a-b*) each having an image sensor (16*a-b*) in mutually offset perspectives for taking two-dimensional starting images (42) as well as a stereoscopic unit (28) which is configured for the application of a stereoscopic algorithm for generating a depth map (46, 50) in that mutually associated part regions are recognized in two two-dimensional images taken within a disparity zone from offset perspectives and their distance is calculated with reference to the disparity. In this respect, a pixel binning unit (30) is provided to generate a two-dimensional intermediate image (48) of lower resolution by binning a respective plurality of pixels from a two-dimensional image (42) and a fusion unit (32) is provided which fuses at least two depth maps (46, 50) to form a common depth map (52), with at least one of the depth maps (50) being generated from intermediate images (48).

10 Claims, 3 Drawing Sheets

Figure 1:
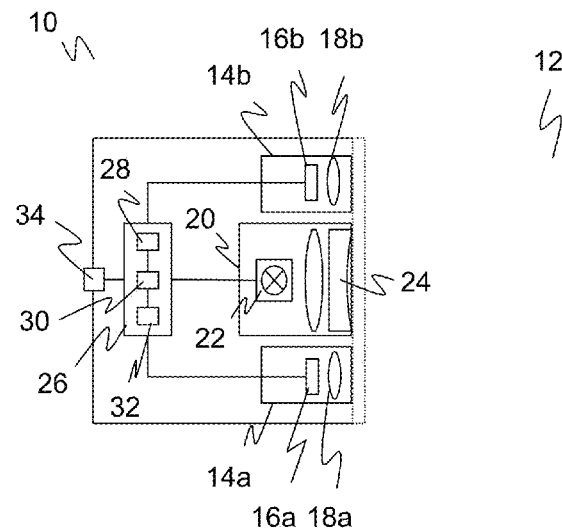

(52) U.S. Cl.
CPC ............... *G06T2207/10012* (2013.01); *G06T 2207/20016* (2013.01); *G06T 2207/30232* (2013.01)

(56) References Cited

U.S. PATENT DOCUMENTS

| | | | | |
|---|---|---|---|---|
| 2007/0102520 | A1* | 5/2007 | Carlson | G06K 7/10722 235/454 |
| 2011/0001799 | A1* | 1/2011 | Rothenberger | G06T 7/0051 348/47 |
| 2011/0096179 | A1* | 4/2011 | Border | H04N 5/23267 348/208.4 |
| 2012/0074296 | A1* | 3/2012 | Hammes | G06K 9/2027 250/205 |
| 2014/0043335 | A1* | 2/2014 | Kobayashi | H04N 13/0022 345/427 |
| 2014/0152647 | A1* | 6/2014 | Tao | G06T 7/0065 345/419 |

OTHER PUBLICATIONS

Zhao, Yong, et al. "Real-Time Stereo on GPGPU Using Progressive Multi-Resolution Adaptive Windows"; Image and Vision Computing; Jan. 27, 2011; vol. 29; pp. 420-432.

Motten, Andy, et al. "Binary Confidence Evaluation for a Stereo Vision Based Depth Field Processor SoC"; IEEE International Conference on Acoustics, Speech and Signal Processing; Vancouver, BC; May 21-31, 2013; pp. 456-460.

Narasimha, Rajesh, et al. "Method for Enhancing Low Quality Depth Maps for 3D Reconstruction on a Embedded Platform"; Texas Instruments, Inc.; 2013; pp. 1538-1542.

Dubbelman, Gijs, et al. "Obstacle Detection During Day and Night Conditions Using Stereo Vision"; International Conference on Intelligent Robots and Systems; San Diego, CA; 2007; 109-116.

Li, Rueihung, et al.; "Disparity Search Range Estimation Based on Dense Stereo Matching", 2013 IEEE 8th Conference on Industrial Electronics and Applications (ICIEA), pp. 753-759, 2013.

Posch, Stefan; "Hierarchial line based depth determination in a stereo image" (English translated title), Kunstliche Intelligenz:Gwai-88, 12. Jahrestagung Eringerfeld, Sep. 19-23, 1988 Proceedings (Informatik-Fachberichte), Sep. 1988, pp. 275-285, XP009184993, with English translation of summary.

Examination Report dated May 14, 2014 corresponding to application No. 10 2013 110 615.3.

Grimson, W.E.L. "A Computer Implementation of a Theory of Human Stereo Vision". Philosophical Transactions of the Royal Society of London, Series B, Biological Sciences; May 12, 1981; vol. 292, No. 1058; pp. 217-253.

* cited by examiner

3D CAMERA IN ACCORDANCE WITH THE STEREOSCOPIC PRINCIPLE AND METHOD OF DETECTING DEPTH MAPS

The invention relates to a 3D camera in accordance with the stereoscopic principle and to a method of detecting depth maps in accordance with the preamble of claim 1 and of claim 10 respectively.

Unlike a conventional camera, a 3D camera also take depth information and thus generates three-dimensional image data with spacing values or distance values for the individual pixels of the 3D image which is also called a distance image or a depth map. The additional distance dimension can be utilized in a number of applications to obtain more information on objects in the scenery detected by the camera and thus to satisfy different objects in the area of industrial sensor systems.

In automation technology, objects can be detected and classified with respect to three-dimensional image data in order to make further automatic processing steps dependent on which objects were recognized, preferably including their positions and orientations. The control of robots or different types of actuators at a conveyor belt can thus be assisted, for example. A typical application in safety technology is the securing of a dangerous machine such as a press or a robot where a securing takes place on an intrusion of a body part into a danger area around the machine.

In mobile applications, whether vehicles with a driver such as passenger vehicles, trucks, work machines or forklift trucks or driverless vehicles such as AGVs (automated guided vehicles) or floor-level conveyors, the environment and in particular a planned travel path should be detected in three dimensions and as completely as possible. Autonomous navigation should thus be made possible or a driver should be assisted in order inter alia to recognize obstacles, to avoid collisions or to facilitate the loading and unloading of transport goods, including cardboard boxes, pallets, containers or trailers.

A known method of determining the depth information is stereoscopy based on human vision with two eyes. For this purpose, an image pair is taken by two cameras with different perspectives and pixels or picture elements corresponding to one another are identified therein. Their mutual offset, called disparity, represents a measure for the distance so that with a knowledge of the optical parameters of the stereo camera the respective distance can be calculated by triangulation. Stereoscopic systems can work passively, that is only with the environmental light, or can have their own illumination which preferably generates a lighting pattern in order also to allow the distance estimation in structureless scenes.

The relationship between the distance of an object and the associated disparity is not linear, but rather hyperbolic. The relative displacement of the corresponding picture elements therefore increases a great deal in the near zone. A stereo camera having typical sensors which scan the scenery equidistantly accordingly has a distance resolution which is very much finer in the near field than in the distance field.

When searching for corresponding picture elements, how far the picture elements in the two images can lie apart from one another at a maximum is determined by a search zone called a disparity zone. The disparity zone corresponds to the detectable distance zone of the stereo camera. A larger disparity zone consequently results in a larger, more expanded distance zone, but also requires more evaluation capacity.

The very high distance resolution in the near zone of the stereo camera is, however, frequently not needed at all in practice. However, due to the reciprocal relationship between the distance and the disparity, a large part of the evaluation effort in the determination of pixel or picture element correspondences falls on the near zone. In order to work with real time capability and efficiently, stereoscopic algorithms can be implemented on a module capable of parallel processing such as an FPGA (field programmable gate array). Different image portions are thereby processed simultaneously. In this respect, however, a disproportionately high amount of resources such as gates or memories are responsible for the processing of the near zone and are thus bound.

It is therefore the object of the invention to provide a more efficient stereoscopic process.

This object is satisfied by a 3D camera in accordance with the stereoscopic principle and by a method of detecting depth maps in accordance with claim 1 and claim 10 respectively. A depth map, that is three-dimensional image data, for example in the form of a pixel-resolved matrix of distance values, is formed by a stereoscopic algorithm which recognizes mutually corresponding picture elements in the two images of two camera modules by correlation, for instance, and calculates their distance from the disparity, i.e. the mutual pixel offset. Correspondences are only sought up to a maximum offset which is predefined by a disparity window.

The invention now starts from the basic idea of treating the near zone and the distance zone differently. For this purpose, intermediate images of a lower resolutions are first generated from the taken images by a respective combination ("binning") of a plurality of pixels. A depth map having a correspondingly reduced resolution, in particular a reduced lateral resolution, is formed from these intermediate images by the stereo algorithm. Due to the reduced resolution, a smaller disparity zone is sufficient for this purpose than if the higher resolution starting images were evaluated in the near zone. A further depth map is obtained from the starting images or from additional intermediate images which have a different resolution with respect to the first observed intermediate images due to a different binning of the pixels. A common depth map is fused from the depth map of reduced resolution and the further depth map. Two sources thus enter into the common depth map: a depth map of higher resolution whose zone preferably covers further distances and a depth map of reduced resolution, preferably for the near zone and in particular supplementing it in a flush manner.

The invention has the advantage that the effort for the evaluation in the near zone can be considerably reduced. The price is a lower distance resolution in the near zone which, however, practically does not make itself noticeable due to the there disproportionately fine distance resolution. A predefined distance zone can thus be covered with a considerably reduced hardware effort or calculation effort. Conversely, with fixed resources, a larger distance zone which can be evaluated can be achieved.

More than two camera modules are preferably used and their images are evaluated in pairs. Spurious correspondences of elongated structures which are arranged in parallel to the connection line of two camera modules are thereby prevented.

The stereo unit preferably has a multichannel structure to calculate in parallel at least one first depth map from a first pair of images and a second depth map from a second pair of images. The obtaining of distance data for the near and distance zones is thereby considerably accelerated. The method in accordance with the invention facilitates the time behavior of such a parallel processing. For a smaller disparity zone is also sufficient for the near zone evaluation due to the pixel binning. In particular the evaluation channels can thus work with the same disparity zone and can thus be synchronized more easily with one another. In principle, a serial processing of the starting images or intermediate images to depth maps is also conceivable. A further parallelization can preferably also be carried out within the evaluation channels, said further parallelization simultaneously processing different image portions.

The pixel binning unit is preferably configured to bin respective rectangular or quadratic adjacency regions of pixels to one pixel. In this respect, in particular respective rectangles of n*m pixels or squares of n*n pixels of the starting images become a respective one pixel of the intermediate images. A resolution halving of the intermediate images is, for example, achieved by a binning of a respective 2*2 pixels. Since the correlation core of the stereo algorithm frequently operates row-wise, a binning of n*1 is also conceivable, that is only within the image row. The intermediate image then, however, only loses resolution in the row direction and not in the column direction.

The pixel binning unit is preferably configured to set a binned pixel to a mean value, a maximum, a minimum or a median of the pixels to be binned. The value of the binned pixel is even more generally a predefined function of the values of the pixels to be binned. This function ensures that the binned pixel represents the pixels to be binned as exactly as possible. This use of language assumes monochromatic image data, for example gray value images or brightness images.

With color images, correspondingly further values per pixel have to be taken into account in an analog manner.

The stereoscopic unit is preferably configured to determine a reliability measure for the distances to be calculated. This reliability measure in particular directly relates to a quality of the agreement of mutually corresponding image zones. Since the correspondences are frequently recognized via correlations, a corresponding correlation coefficient is also delivered with less or now additional effort. In downstream evaluations, the reliability of the measured distances can represent an important piece of information.

The fusion unit is preferably configured to take over the respective most reliable determined distance from the two depth maps into the common depth map. The values of the common depth map are overdetermined when both entering depth maps deliver a distance value. In accordance with this embodiment, the reliability measure is then used as a decision criterion as to which decision value is the better.

The fusion unit is preferably configured to take over distances present in this respect of the highest resolution depth map into the common depth map and to fill only gaps from a lower resolution depth map. The intermediate images lose resolution through the pixel binning. Provided therefore that the stereo algorithm has arrived at a distance calculation with the starting images or the highest resolution intermediate images used, these values are usually the better. Possible gaps are then supplemented by the depth map from the lower resolution intermediate images in which the disparity zone is designed for closer objects.

The preferred use of the reduced depth map of the near zone is also conceivable since objects in the near zone have a greater importance in various applications, for instance in safety engineering. In this variant, the gaps of the reduced depth map are supplemented by values of the high resolution depth map.

The fusion unit is preferably configured to increase the resolution of a depth map by duplication of pixels. This is an intermediate step to be able to work on the fusing of depth maps having the same resolution. In simplified terms, the binning is thus reversed again as well as still achievable with the reduced information (upsampling). A simple possibility of increasing resolution is to generate n*m pixels having the value of the starting pixel from each starting pixel of the low resolution depth map. Postprocessing operations are conceivable, for instance to fill up object structures or to smooth transitions.

The fusion unit is preferably configured to fuse three or more depth maps of different resolution. The distance zone is here therefore not only divided into a near zone and into a distance zone, but at least one intermediate zone is added which is covered by intermediate images having a different resolution. Depth maps from the starting images, from a first intermediate pair having a first pixel binning and a second intermediate image pair having a second pixel binning or alternatively three intermediate image pairs having pixel binning differing pairwise can thus be used as three depth maps entering into the fusion. The same applies accordingly with four or more depth maps entering into the fusion. The respective disparity zones and thus distance zones as well as the pixel binning processes are preferably coordinated with one another so that the common depth map overall covers a desired distance zone as the working zone of the 3D camera.

The method in accordance with the invention can be further developed in a similar manner and shows similar advantages in so doing. Such advantageous features are described in an exemplary, but not exclusive manner in the subordinate claims dependent on the independent claims.

Figure 2:
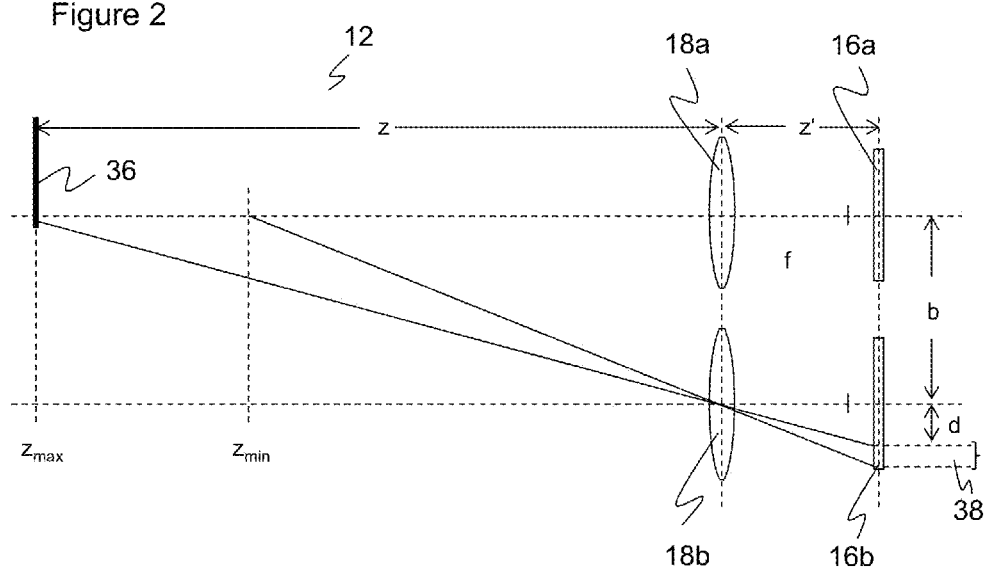
Figure 3:
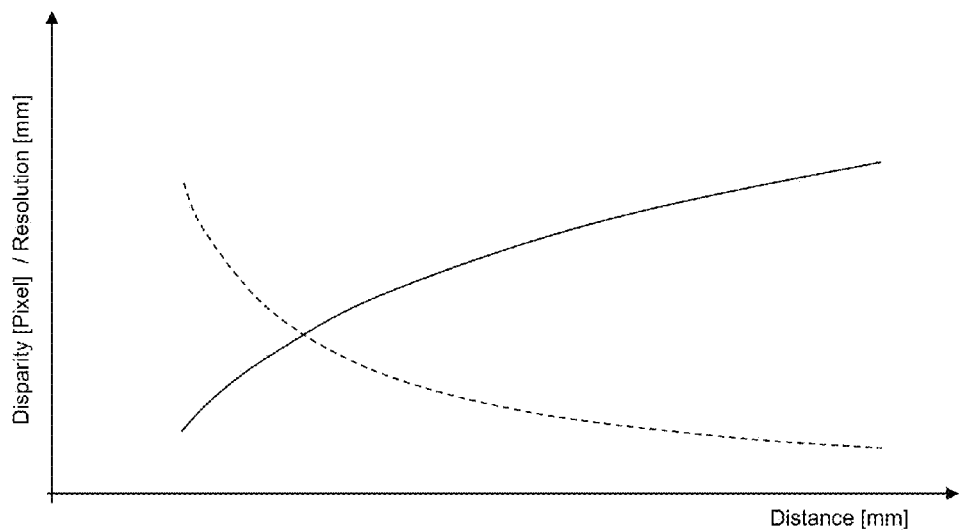
Figure 4:
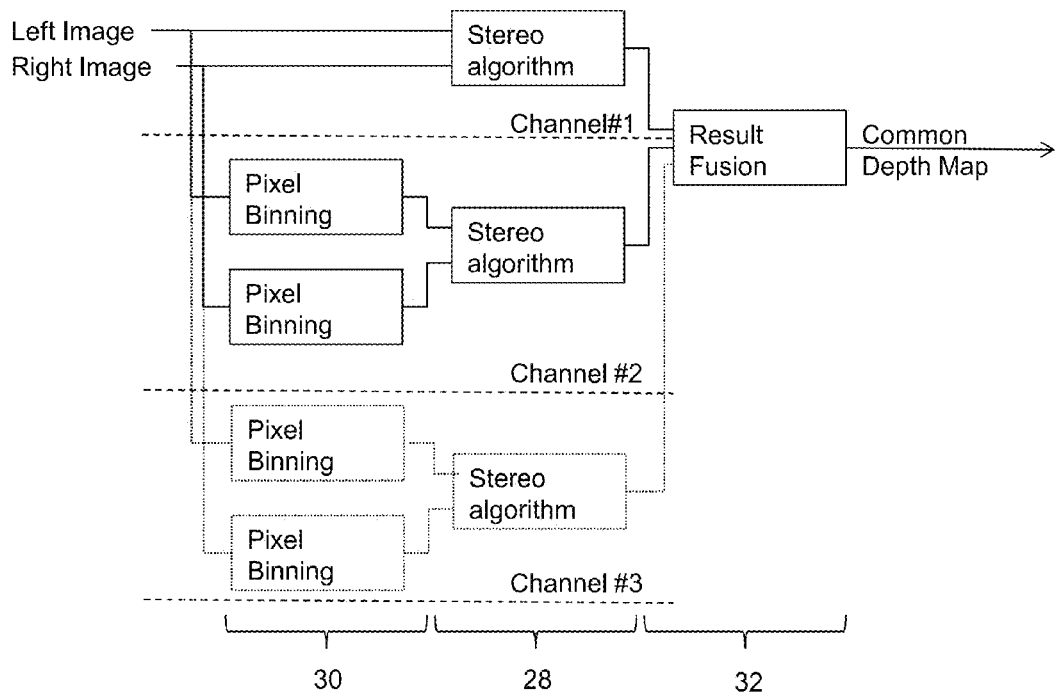
Figure 5:
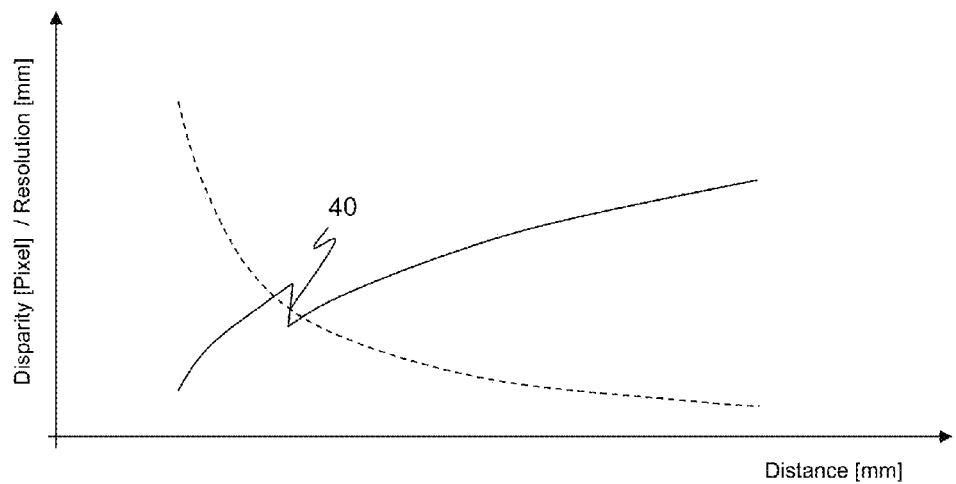
Figure 6A:
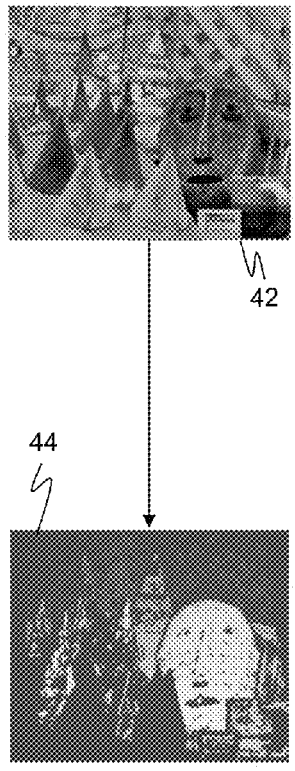

The invention will be explained in more detail in the following also with respect to further features and advantages by way of example with reference to embodiments and to the enclosed drawing. The Figures of the drawing show in:

FIG. 1 a schematic sectional representation of a stereo camera;

FIG. 2 a schematic representation of the optical relationships in the distance estimation with a stereo camera;

FIG. 3 the behavior of the disparity and of the resolution dependent on distance in a uniform evaluation of the starting images of a stereo camera;

FIG. 4 a block diagram of a stereo evaluation with an additional depth image from intermediate images created by pixel binning and subsequent fusing;

FIG. 5 a representation similar to FIG. 3 of the distance-dependent behavior of the disparity and of the resolution with an evaluation divided into two of starting images and intermediate images;

FIG. 6a a starting image and a depth map with a uniform evaluation; and

Figure 6B:
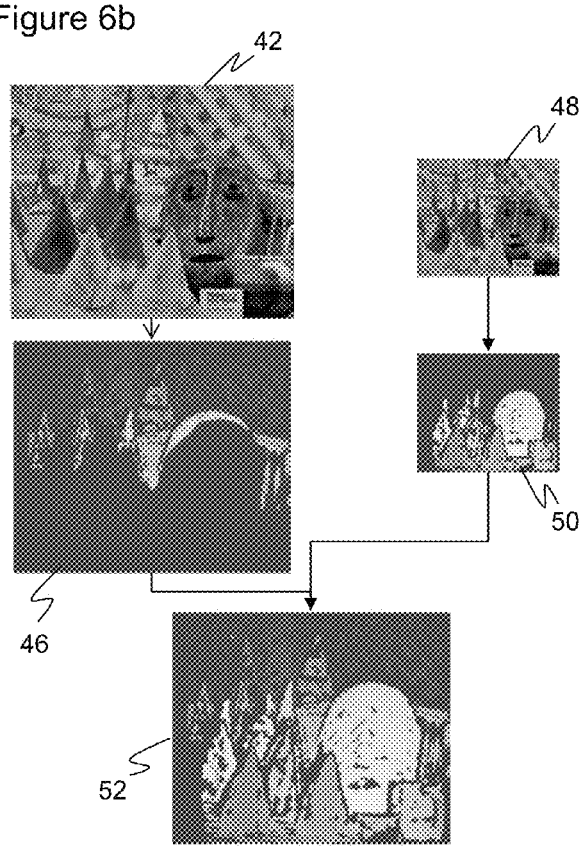

FIG. 6b a starting image, an intermediate image generated therefrom by pixel binning, the respective depth maps corresponding to the starting image and to the intermediate image as well as a common depth map obtained after fusion of the depth maps.

FIG. 1 first shows in a block diagram the structure of a 3D camera 10 for taking depth maps of a monitored or spatial zone 12. Two camera modules 14a-b are mounted at a known fixed distance from one another therein and each take images of the spatial zone 12. An image sensor 16a-b, usually a matrix-type imaging chip, for example a CCD or a CMOS sensor, is provided in each camera and takes a rectangular pixel image. A respective objective having an imaging optics is associated with the image sensors 16a-b; it is shown as a lens 18a-b and can in practice be realized as any known imaging optics. An optional illumination unit 20 having a light source 22 is shown between the two camera modules 14a-b and its spatial arrangement is only to be understood as an example.

A combined evaluation and control unit 26 having a stereoscopic unit 28, a pixel binning unit 30 and a fusion unit 32 is connected to the two image sensors 16a-b and to the illumination unit 20. A three-dimensional image (distance image, depth map) of the spatial zone 12 is generated therein in a manner still to be described from the image data of the images sensors 16a-b using a stereoscopic algorithm. The evaluation and control unit 26 can comprise one or more digital modules, in particular modules which are adapted for a fast, parallel processing of large data volumes, for instance an FPGA (field programmable gate array) or a GPU (graphics processing unit).

The 3D camera 10 can output depth maps or other measured results via an output 34; for example, raw image data of a camera module 14a-b, but also evaluation results such as object data or the identification of specific objects. Especially in a safety engineering application, the recognition of an unauthorized intrusion into protected fields which were defined in the spatial zone 12 can result in the output of a safety-oriented shut-down signal. For this reason, the output 34 is then preferably designed as a safety output (OSSD, output signal switching device) and the 3D camera is structured in total as fail-safe in the sense of relevant safety standards.

FIG. 2 schematically shows the optical relationships in the detection of depth maps and in the distance calculation in accordance with the stereoscopic principle. The two camera modules 14a-b with their images sensors 16a-b and with objectives shown as lenses 18a-b are arranged next to one another and with optical axes in parallel with one another at a base spacing b measured along a base line. The lenses 18a-b have a focal length f. A detected object 36 is located at a distance which is designated by the object width z. A structure of the object 36 which is, for example, imaged centrally on the one image sensor 16a is imaged on the other image sensor 16b offset by a disparity d due to the different perspectives of the image sensors 16a-b. The detectable distances from $z_{min}$ to $z_{max}$ correspond to a disparity zone 38 within which a search for corresponding picture elements is made in the two images of the image sensors 16a-b. The relationship between the disparity d and the distance z is given with these geometrical values as $z=z'b/d \approx fb/d$, under the prerequisite that the object width z is a great deal larger than the image width z'.

The offset or the disparity accordingly grows inversely proportionally to the distance or at 1/z. The effort of finding correspondences thus increases disproportionately because a disparity zone which is a great deal larger, in the extreme case equal to the pixel number per row of the image sensors 16a-b, has to be evaluated parallel to the base line. At the same time, the distance resolution becomes the better, the closer an object comes to the stereo camera 10. FIG. 3 illustrates the distance-dependent behavior of the disparity (dashed line) and of the resolution (solid line, shown logarithmically).

FIG. 4 shows a block diagram of a stereo evaluation with an additional depth image from intermediate images created by pixel binning and from subsequent fusing. It is thereby made possible also to recognize correspondences of objects 36 in the near zone having a comparatively small disparity zone. The typically unnecessarily high distance resolution in the near zone is reduced in this respect to achieve savings in the effort.

Two images, which are termed the left image and the right image in FIG. 4, are supplied to the evaluation and control unit 26 from the image sensors 16a-b in an evaluation cycle for generating a common depth map. The respective sub-unit 28-32 of the evaluation and control unit 26 is named by its reference numeral in the lower part of FIG. 4. This distribution of work is to be understood by way of example and not rigidly since the units 28-32 can take over work from one another in other embodiments.

In a first channel, the starting images are supplied directly to the stereoscopic unit 30 and a first depth map is generated there with the aid of the stereoscopic algorithm. For this purpose, the disparity is determined as usual in an associated disparity zone. However, this disparity zone is reduced with respect to a disparity zone required for the total distance zone of the 3D camera 10, halved for example, so that only a relatively remote, preferably an intermediate and further distance region, is determined by the depth map from the first channel. The restriction of the disparity zone allows a corresponding saving of hardware resources or calculation effort in the first channel.

In parallel with this, a second depth map is calculated in a second channel which covers the remaining near zone. The left image and the right image of the image sensors 16a-b are here first supplied to the pixel binning unit 30. A binning of adjacent pixels in a pixel binning block takes place therein, for example with two times two pixels in a horizontal and a vertical direction, to form one binned pixel. Pixels of larger dimensions (downsampling) arise so-to-say through the binning, whereby the lateral resolution of the arising intermediate images in comparison with the left image and the right image and consequently also the distance resolution is reduced. The value of the binned pixels of the intermediate images is determined from the values of the pixels to be binned in the left image and in the right image by a function such as the mean value, median, maximum or minimum.

The pixel binning unit 30 transfers the intermediate images to the stereoscopic unit 28 which generates a second depth map of reduced resolution from this. The search for pixel correspondences preferably takes place here in a disparity zone which corresponds to the near distances still to be covered. Due to the pixel binning, however, the effort is anyway reduced so that alternatively it is also possible to work with a wider disparity zone or in a sensible framework predefined by the total pixel number even with a maximum possible disparity zone. The disparity zones in the channels should at least preferably be coordinated with one another so that a complete coverage of the required distance zone of the 3D camera 10 can be ensured.

In further embodiments, a third channel or even further channels can optionally be provided. These channels work like the second channel in principle, with a respective other pixel binning being implemented and the disparity zones being selected and associated correspondingly so that overall the distance zone of the 3D camera 10 is covered without a gap, with or without overlap in the channels. In a further alternative embodiment, a pixel fusion is also already carried out in the first channel which then differs from the pixel fusion in the other channels.

The two or more depth maps generated in this manner in the channels are subsequently fused with one another to form a common depth map in the fusion unit 32. Depth maps with reduced resolution are brought in preparation to the highest resolution of a supplied depth map, in particular the resolution of the left image and of the right image. This is done by duplicating the pixels (upsampling, pixel replication) in that an adjacency block with a plurality of pixels is generated from each pixel of the depth map with reduced resolution.

Subsequently, in the fusion, the distances of the entering depth maps are compared pixel-wise. Different fusing strategies are then conceivable. For example, the respective most reliably calculated distance is selected for the common depth map, with the reliability being a quality measure of the stereoscopic algorithm for the respective found disparity, for instance a correlation coefficient, stored pixel-wise for the distances. It is also conceivable that only one of the depth maps has a valid distance at all in a pixel. Gaps of the one depth map can then be supplemented by information from the other depth map or from the other depth maps with a corresponding reliability.

The conversion of disparities into distances takes place using the conversions set forth above with respect to FIG. 2 either in the stereoscopic unit 30 for the individual depth maps or preferably only in the fusion unit 32 from the respective disparities selected there because this requires fewer calculation steps. The fusion unit 32 then, contrary to the above use of language, compares disparities instead of distances, which is, however, equivalent due to the monotone conversion provision.

FIG. 5 shows in a representation similar to FIG. 3 the distance-dependent behavior of the disparity (dashed line) and of the resolution (solid line) of the divided evaluation in accordance with FIG. 4. A jump in the resolution results at the transition 40 of the two channels. The resolution is therefore not constantly better with greater proximity. This higher resolution is anyway not utilized by most applications and it is possible to ensure by a selection of the pixel binning and of the disparity that the jump also remains below a required minimum resolution.

FIG. 6 finally shows an application of the divided stereoscopic process with pixel binning on example images. The example is based on an application of the method in accordance with the invention on a data set which the authors of the paper D. Scharstein and R. Szeliski: "High-accuracy stereo depth maps using structured light", in *IEEE Computer Society Conference on Computer Vision and Pattern Recognition* (CVPR 2003), Vol. 1, pages 195-202, Madison, Wis., June 2003, kindly provide for use and publication on their website. In this respect, FIG. 6a shows for comparison a conventional evaluation with a wide disparity zone of 64 pixels and FIG. 6b shows a divided evaluation with a halved disparity zone of 32 pixels for both channels.

In the conventional process in accordance with FIG. 6a, the depth map 44 to be determined is generated directly by the stereoscopic algorithm from the starting image, of which the left image 42 is shown as a representative.

FIG. 6b shows in the left hand column the same left image 42 from which a first depth map 46 is generated from the disparity zone halved in the first channel with respect to FIG. 6a. The first depth map 46 clearly recognizably has gaps in the near zone with respect to the depth map 44 of FIG. 6a because correspondences in the near zone are not recognized due to the reduced disparity zone. In the right column of FIG. 6b, the intermediate image 48 of reduced resolution in which 2*2 pixels are binned to one pixel is first shown at the top which is generated from the left image 42 in the second channel in the pixel binning unit 30. The stereoscopic unit 28 calculates a second depth map 50 of correspondingly reduced resolution from the intermediate images 48. Structures in the near zone complementary to the first depth map 46 and as a result gaps in the distance zone can be recognized here.

The fusion unit 32 generates a common depth map 52 from the first depth map 46 and the second depth map 50. In this respect, mutual gaps are primarily filled in. For pixels in which both depth maps 46, 50 indicate a distance value, a decision has to be made or a calculation has to take place, for example using a quality measure of the stereo algorithm. The intermediate step in which the resolution of the second depth map 50 is increased by duplication of each of its pixels to a 2'2 pixel block is not shown in FIG. 6b. It can immediately be recognized that the common depth map 52 reproduces the scenery substantially better than each individual depth map 46, 50. A simple halving of the disparity zone would in particular have serious effects in a conventional process as can be recognized by a look at the first depth map 46 with respect to the depth maps 44, 52.

The comparison of the depth maps 44 conventionally generated with a wide disparity zone and of the common depth map 52 shows a certain resolution loss at some points in the near zone. This resolution loss is, as mentioned a multiple of times, usually of no significance in practice. In return, only the common depth map 52 resolves particularly close structures because the adapted disparity zone, when used on the intermediate images, comes closer toward the 3D camera 10. The effort for the halved disparity zones is above all substantially reduced. This is particularly useful when the evaluation of the channels is carried out sequentially.

The invention claimed is:

1. A 3D camera in accordance with the stereoscopic principle for detecting depth maps of a monitored zone which has at least two camera modules each having an image sensor in mutually offset perspectives for taking two-dimensional starting images as well as a stereoscopic unit which is configured for the application of a stereoscopic algorithm for generating a depth map, in that mutually associated part zones are recognized in two two-dimensional images within a disparity zone taken from offset perspectives and their distance is calculated with reference to the disparity, further comprising a pixel binning unit to generate a two-dimensional intermediate image of lower resolution by binning a respective plurality of pixels from a two-dimensional image; further comprising a fusion unit which fuses at least two depth maps to form a common depth map, with at least one of the depth maps being generated from intermediate images.

2. The 3D camera in accordance with claim 1, wherein the stereo unit is made up of multiple channels to calculate in parallel at least one first depth map from a first pair of images and a second depth map from a second pair of images.

3. The 3D camera in accordance with claim 1, wherein the pixel binning unit is configured to bin respective rectangular or quadratic adjacency regions of pixels to form one pixel.

4. The 3D camera in accordance with claim 1, wherein the pixel binning unit is configured to set a binned pixel to a mean value, to a maximum, to a minimum or to a median of the pixels to be binned.

5. The 3D camera in accordance with claim 1, wherein the stereoscopic unit is configured to determine a reliability measure for the calculated distances.

6. The 3D camera in accordance with claim 5,
wherein the fusion unit is configured to take over the respective most reliably determined distance from the two depth maps into the common depth map.

7. The 3D camera in accordance with claim 1,
wherein the fusion unit is configured to take over distances present in this respect of the highest resolution depth map into the common depth map and to fill only gaps from a lower resolution depth map.

8. The 3D camera in accordance with claim 1,
wherein the fusion unit is configured to increase the resolution of a depth map by duplication of pixels.

9. The 3D camera in accordance with claim 1,
wherein the fusion unit is configured to fuse three or more depth maps of different resolution.

10. A method of detecting depth maps of a monitored zone by means of a stereoscopic algorithm which recognizes mutually associated part regions in two two-dimensional images of the monitored zone taken within a disparity zone from offset perspectives and calculates an associated distance with reference to the disparity,
wherein two dimensional intermediate images of lower resolution are generated from the two-dimensional images by binning a plurality of pixels;
and wherein a common depth map is fused from at least two depth maps, with at least one of the depth maps being generated from intermediate images.

* * * * *